United States Patent [19]
Goldston et al.

[11] Patent Number: 5,956,373
[45] Date of Patent: Sep. 21, 1999

[54] AM COMPATIBLE DIGITAL AUDIO BROADCASTING SIGNAL TRANSMISION USING DIGITALLY MODULATED ORTHOGONAL NOISE-LIKE SEQUENCES

[75] Inventors: Don R. Goldston, Mason; David W. Evans, Lebanon; David C. Hartup, West Chester, all of Ohio

[73] Assignee: USA Digital Radio Partners, L.P., Columbia, Md.

[21] Appl. No.: 08/749,098

[22] Filed: Nov. 14, 1996

Related U.S. Application Data

[60] Provisional application No. 60/006,881, Nov. 17, 1995.

[51] Int. Cl.$^6$ ............................................. H04L 27/36
[52] U.S. Cl. ................. 375/298; 375/261; 375/200; 375/208; 375/300; 332/103; 332/151
[58] Field of Search ........................... 375/200, 206, 375/208, 298, 295, 300, 261, 260, 268; 332/149, 151, 103

[56] References Cited

U.S. PATENT DOCUMENTS

| | | | |
|---|---|---|---|
| 5,127,021 | 6/1992 | Schreiber | 375/200 |
| 5,285,470 | 2/1994 | Schreiber | 375/200 |
| 5,488,629 | 1/1996 | Takahashi et al. | 375/206 |
| 5,588,022 | 12/1996 | Dapper et al. | 375/216 |

*Primary Examiner*—Jason Chan
*Assistant Examiner*—Jean B Corrielus
*Attorney, Agent, or Firm*—Robert P. Lenart

[57] ABSTRACT

A digital modulation technique, broadcast system, and apparatus for the spectral superposition of an analog AM signal and a novel digitally modulated signal. Multiple mutually orthogonal, continuous-valued noise-like sequences are amplitude and phase modulated. Preferably, modulation coefficients are mapped from the formatted data to be transmitted and basis waveforms are generated which are then modulated by the modulation coefficients. These modulated waveforms may be ASK modulated lowpass waveforms and QAM or in-phase ASK modulated bandpass waveforms. Alternatively, the modulated waveforms may be double sideband QAM modulated lowpass waveforms and QAM modulated bandpass waveforms. In the broadcast system of the present invention, an amplitude modulated signal having a first frequency spectrum is broadcast simultaneously with a plurality of amplitude and/or phase modulated orthogonal noise-like signals having a bandwidth which encompasses the first frequency spectrum. The amplitude modulated signal includes a first carrier modulated by an analog signal. A first group of the amplitude and/or phase modulated orthogonal noise-like signals lying within the first frequency spectrum are modulated in-quadrature with said first carrier signal. The second and third groups of the amplitude and/or phase modulated orthogonal noise-like signals lie outside of the first frequency spectrum and are modulated both in-phase and in-quadrature with the first carrier signal.

23 Claims, 13 Drawing Sheets

1

AM COMPATIBLE DIGITAL AUDIO BROADCASTING SIGNAL TRANSMISION USING DIGITALLY MODULATED ORTHOGONAL NOISE-LIKE SEQUENCES

RELATED APPLICATIONS

This Application claims the benefit of U.S. Provisional Application No. 60/006,881, filed Nov. 17, 1995.

BACKGROUND OF THE INVENTION

1. Field of the Invention

This invention relates to radio broadcasting and, more particularly, to methods of and apparatus for the spectral superposition of an analog AM signal and a digitally modulated signal wherein the modulation consists of amplitude and/or phase modulation of multiple mutually orthogonal, continuous valued noise-like sequences into a multidimensional constellation.

2. Description of Related Art

There has been increasing interest in the possibility of broadcasting digitally encoded audio signals to provide improved audio fidelity. Several approaches have been suggested. One such approach, set forth in copending U.S. Pat. No. 5,588,022, assigned to the assignee hereof, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth which encompasses the first frequency spectrum. Each of the digitally modulated carrier signals is modulated by a portion of a digital program signal. A first group of the digitally modulated carrier signals lies within the first frequency spectrum and is modulated in-quadrature with the first carrier signal. Second and third groups of the digitally modulated carrier signals lie outside of the first frequency spectrum and are modulated both in-phase and in-quadrature with the first carrier signal. Both transmitters and receivers are provided in accordance with that method. The waveform in the AM compatible digital audio broadcasting system described in U.S. Pat. No. 5,588,022, hereby incorporated herein by reference, combines analog amplitude modulation with multiple digitally modulated carriers in the same spectrum as the analog AM signal.

In the related area of FM broadcasting, there has also been an interest in using spread spectrum noise-like sequences. However, because of the larger bandwidth of the FM channel there has been no need for methods, like multidimensional modulation, to increase the amount of information which can be transmitted.

The quality of the audio signal can be enhanced is largely dependent on the amount of data which can be transmitted through the channel. The more data that can be effectively transmitted, and also demodulated, the greater the level of audio fidelity that can be achieved. Since the bandwidth of the AM channel is relatively narrow there is a need for a method to increase the amount of data which can be effectively transmitted.

SUMMARY OF THE INVENTION

The digital modulation method, broadcast system, and apparatus of the present invention successfully provides for transmitting an increased amount of data. The digital modulation technique comprises amplitude and phase modulation of multiple mutually orthogonal continuous valued noise-like sequences. The digitally modulated spread spectrum noise-like sequences replaces the OFDM modulation technique of the heretofore incorporated copending patent application. Multilevel amplitude and phase modulation of the noise-like sequences provides for the effective transmission of more data in the same bandwidth. The spread spectrum technique provides increased resistance to narrow band interference and improved resistance to channel anomalies. Multilevel amplitude and phase modulation of the noise-like sequences provides for the effective transmission of more data in the same bandwidth. The noise-like sequences also effectively spread the signal out over the spectrum better than binary sequences. The noise-like sequences can be spectrally shaped to avoid interference with other signals present in the same channel and orthogonalized without losing their spectral shape.

The method of digital modulation of the present invention maps amplitude and phase modulation coefficients from the formatted data which is to be transmitted. These coefficients then amplitude and phase modulate a basis set of orthogonal noise-like waveforms which are modulated with the appropriate phase versions of the AM signal and then transmitted simultaneously with the AM signal.

BRIEF DESCRIPTION OF THE DRAWINGS

The invention will be more readily apparent to those skilled in the art by reference to the accompanying drawings wherein.

DESCRIPTION OF THE PREFERRED EMBODIMENTS

Figure 1:
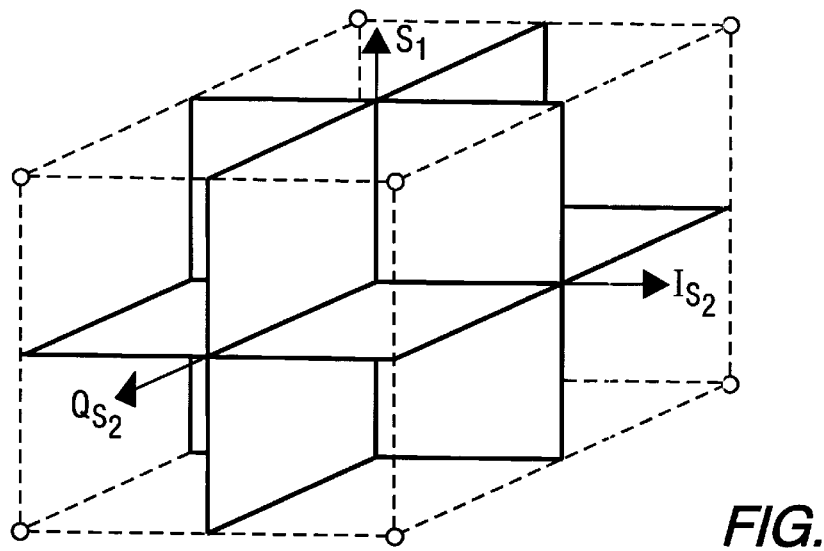
FIG. 1 illustrates a multidimensional constellation.

FIG. 1 illustrates a multidimensional constellation, where $s_1$ is binary-phase shift keyed (BPSK) and $s_2$ is quadrature-phase shift-keyed (QPSK). The three orthogonal dimensions are $s_1$, the in-phase component of $s_2$ ($Is_2$), and the quadrature-phase component of $s_2$ ($Qs_2$). Once a set of orthogonal spreading waveforms has been designed, it may be modulated with binary information. Each waveform may be amplitude modulated (AM), phase modulated (PM), or combined AM and PM, of which quadrature AM (QAM) is a special case. The dimensionality of the constellation may be arbitrarily large depending on the number of waveforms and the level of modulation on each waveform. The demodulator computes a multidimensional minimum-distance decision statistic. The multidimensional constellation may be trellis-coded in order to increase the minimum distance of the symbols.

Figure 2:
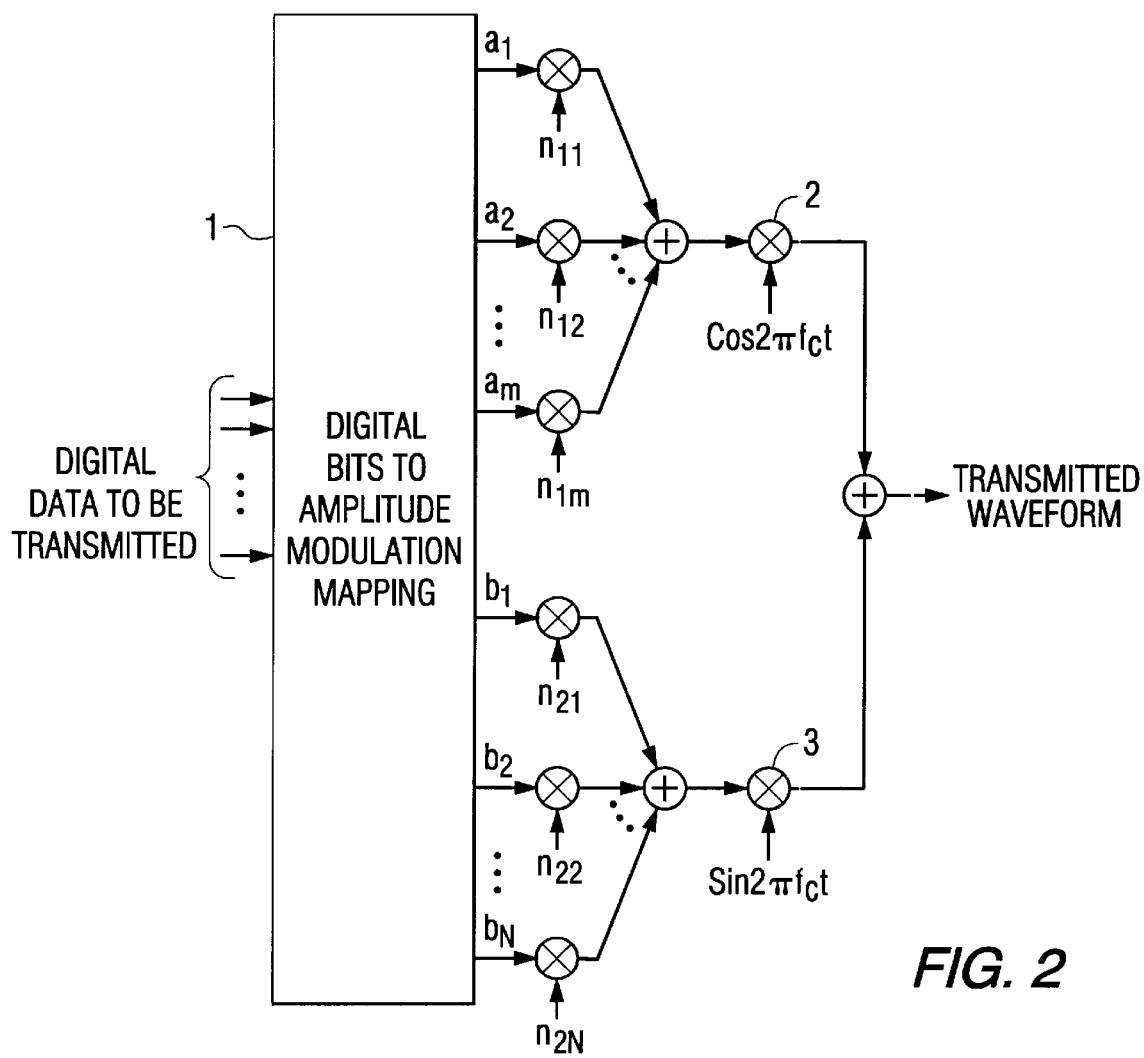
FIG. 2 illustrates a method of modulating real valued noise-like sequences.

FIG. 2 illustrates a method of modulating real valued noise-like waveforms. The a's and b's are real values that amplitude modulate real-valued, noise-like sequences, $n_{M,N}$. The values of the a's and b's are determined by a mapping from digital bits to discrete amplitude values by digital to AM mapping unit 1. The a's modulate a first set of noise-like sequences, and the b's modulate a second set. The sequences within each set are orthogonal to each other. The sequences in the second set may be identical, orthogonal to, related through a time-rotation or amplitude-scaling factor, or may be independent of the sequences in the first set. The first set of modulated sequences are added together, as are the second set of modulated sequences. Then the sum of the first set of sequences is modulated by the desired carrier at cos mixer 2, and the sum of the second set of sequences is modulated with a phase quadrature version of the same carrier at sin mixer 3. The modulated sequences are added together and transmitted.

Figure 3:
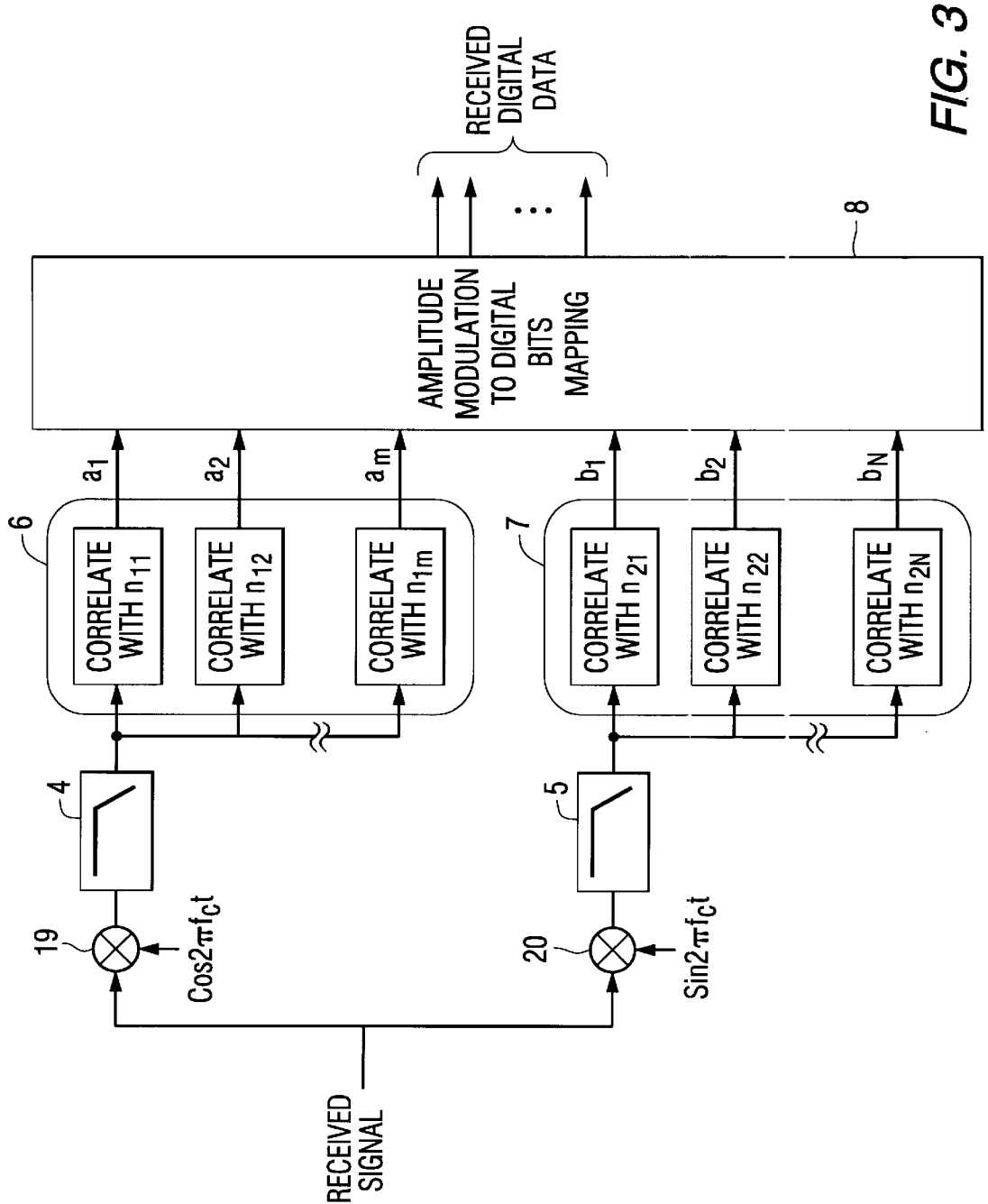
FIG. 3 is a block diagram of a demodulator for FIG. 2.

FIG. 3 is a block diagram of a demodulator for the waveform generated by the modulator shown in FIG. 2. The received waveform is separated into its quadrature components using the sin and cos mixers, 19 and 20, respectively, shown in the figure. The mixer outputs are filtered at filters 4 and 5 to eliminate the sum frequency terms. The filter outputs are input to correlators 6 and 7 that extract the transmitted a and b values. The amplitude modulation values are then mapped to digital bits by AM to digital mapping unit 8.

Figure 4:
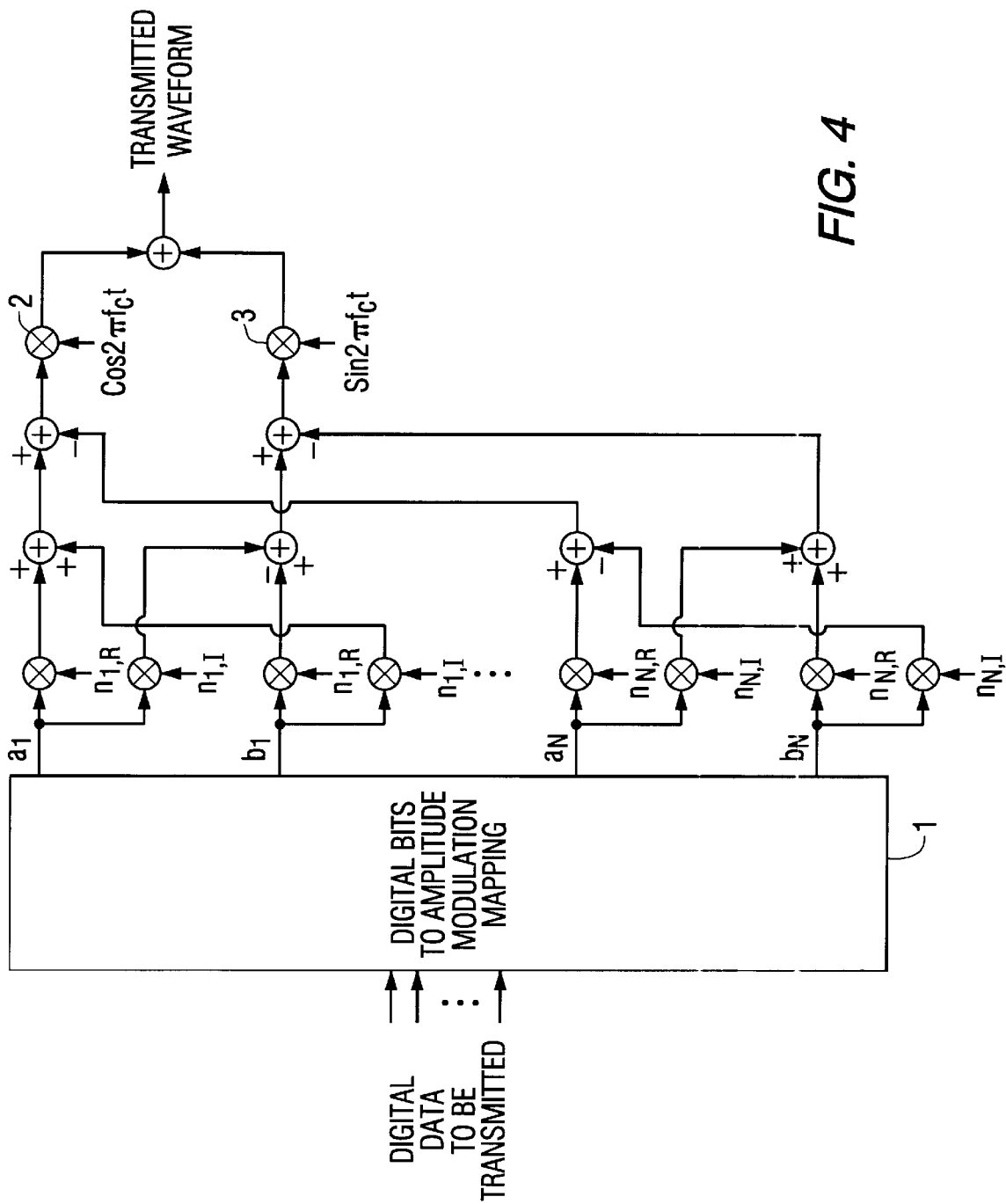
FIG. 4 illustrates a method of modulating complex valued noise-like sequences.

FIG. 4 illustrates a method that can be used to modulate complex noise-like sequences. In this case each complex sequence is orthogonal to every other complex sequence, meaning that the integral over the sequence duration of one sequence times the complex conjugate of another sequence is equal to zero. As shown in the figure, one pair of real-valued amplitude modulation coefficients (a's and b's) modulate the real ($n_R$'s) and imaginary ($n_I$'s) components of one complex sequence. Appropriate products are added together. The same operations are performed for other complex sequences. One set of summed pairs are added together and modulated by the desired carrier at cos mixer 2. The other set of summed pairs are added together and modulated by a phase quadrature version of the same carrier at sin mixer 3. The modulated outputs are added to form the transmitted waveform.

Figure 5:
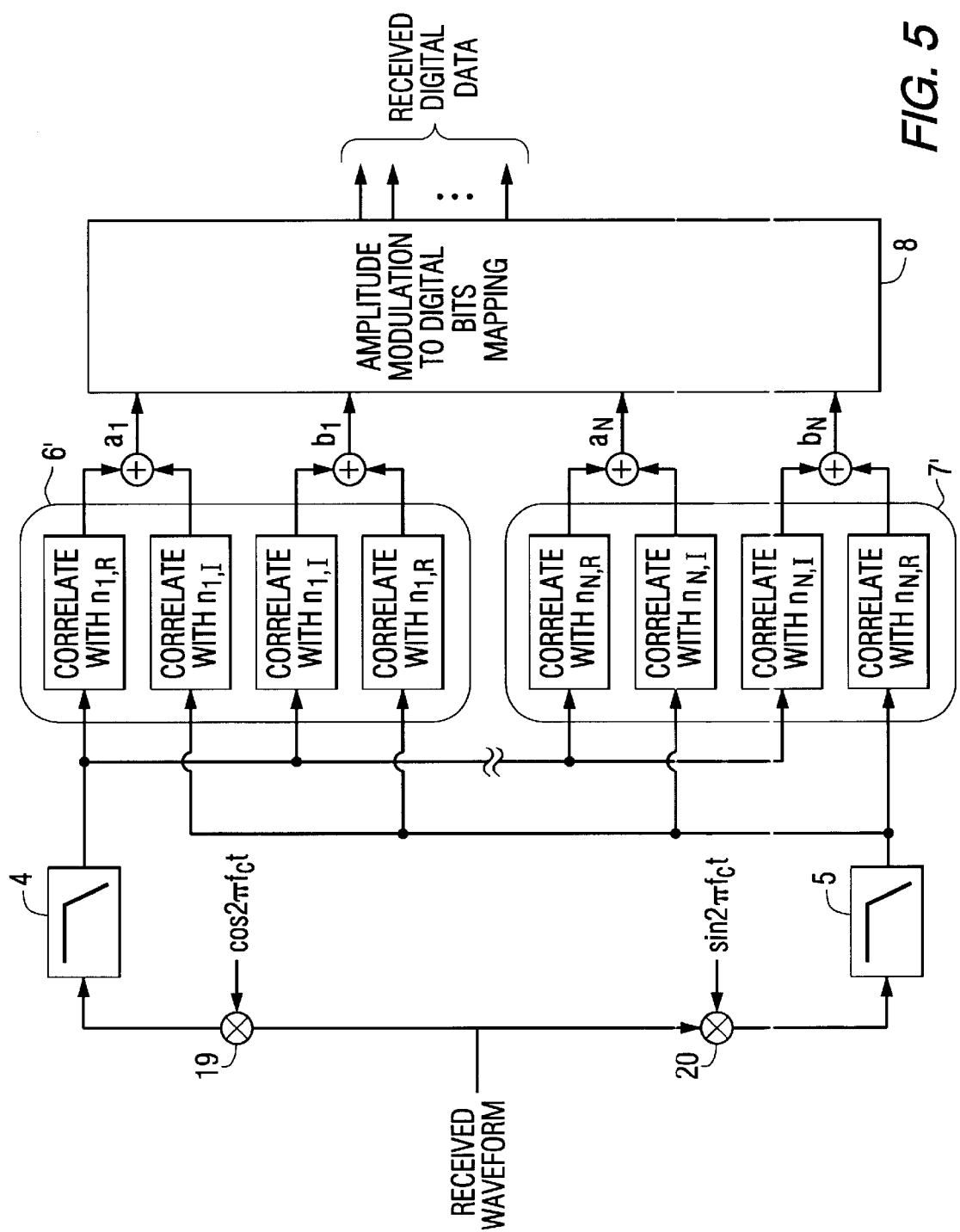
FIG. 5 is a block diagram of a demodulator for FIG. 4.

FIG. 5 is a block diagram of a demodulator for the waveform generated by the modulator shown in FIG. 4. The received waveform is separated into its quadrature components. Correlations are performed at correlators 6' and 7' on the quadrature components as shown in the figure. Appropriate pairs of correlator outputs are summed to extract the transmitted a and b values. The amplitude modulation values are then mapped to demodulated digital bits by AM to digital mapping unit 8.

As an alternative to the above procedure, in addition to the complex sequences being orthogonal, the sequences could be generated such that the real and imaginary components are orthogonal to each other.

It is of interest to consider the channel capacity of digitally modulated noise-like sequences. Because the AM digital audio broadcasting (AM-DAB) application is of particular interest, the capacity in an AM channel with a bandwidth of approximately 30 kHz will be determined. The spectral allocation shown in FIG. 6 will be assumed. As shown in this figure, the spectrum of the analog AM signal 9 is at the center of the channel and occupies a bandwidth of approximately 12 kHz. The digital signal 10 is located on both sides of the analog spectrum, occupying the spectral region between approximately 7 and 16 kHz for both positive and negative frequencies.

The noise-like sequences could have energy in both sidebands. Alternatively, the noise-like sequences could have energy in only one sideband, in which case each sideband would transmit a portion of the information. The former approach may be preferable because it could provide more resistance to channel anomalies and interference.

Figure 6:
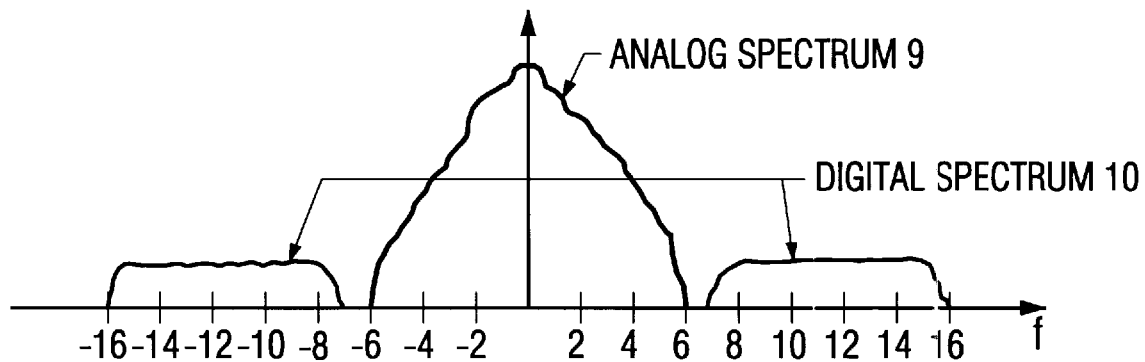
FIG. 6 is a spectral representation of an analog signal and a digital signal.

For the spectrum shown in FIG. 6, the effective bandwidth of the digital signal is approximately $2*(16-7)*0.8 \approx 14$ kHz. The factor of 0.8 is a factor that accounts for the spectral roll-off at the band edges. Previous work with an OFDM-based system has shown that the SNR in this region of the AM band is sufficient to receive 5 bits/sec/Hz at useful ranges. Therefore, approximately $5*14=70$ kbps can be transmitted using this method. This data rate may not be high enough for the AM DAB application.

Figure 7:
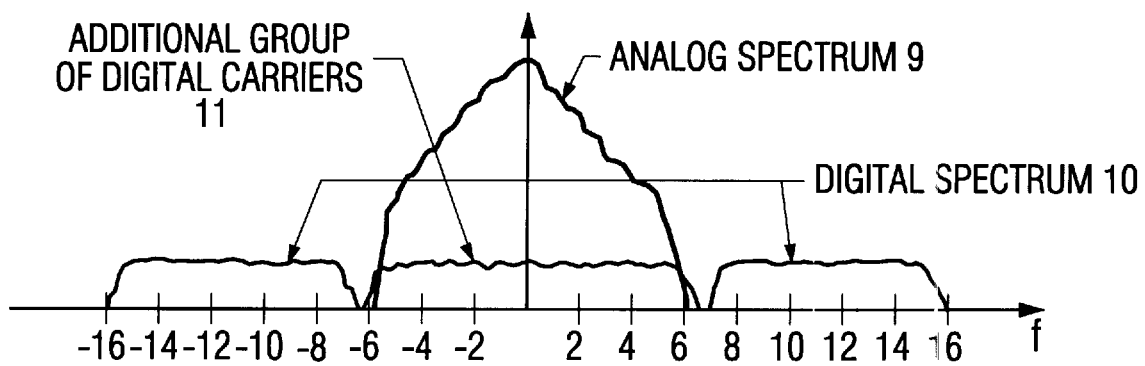
FIG. 7 is a spectral representation of an analog signal and a digital signal.

In order to increase the data capacity, an additional group of carriers 11 can be added beneath the analog signal 9. A spectral plot of this concept is shown in FIG. 7. The carriers 11 that are beneath the analog signal 9 are in phase quadrature to the analog signal to minimize interference. Therefore, the data-carrying capacity of these carriers is reduced by a factor of 2. The effective bandwidth of group of carriers 11 is approximately $7.5*2*0.8=12$ kHz. Work with the OFDM system has shown that carriers in this spectral region can transmit approximately 4 bits/sec/Hz. Therefore, the data capacity for this group of carriers is $(12*4)/2=24$ kbps, for a total capacity of $70+24=94$ kbps. This rate may still be less than is needed for the AM DAB application. To increase the channel capacity, overlap of the digital portion of third adjacent channels (channels separated by 30 kHz) may be allowed without significantly affecting performance. If the total bandwidth of the outer groups of carriers 10 can be increased to approximately $(16-7)*2=18$ kHz, then the data rate for this group can be increased to approximately $5*18=90$ kbps, for a total channel capacity of approximately $90+24=114$ kbps.

As noted above, a group of the noise-like carriers 11 may be placed beneath the spectrum of the analog signal 9. These carriers increase the channel capacity, but care must be taken to minimize the interference to the analog signal.

One method that can be used to minimize the interference is to place the noise-like sequences in phase quadrature to the analog signal. This minimizes the audio output signal to interference ratio for traditional envelope (AM) detectors.

Figure 8:
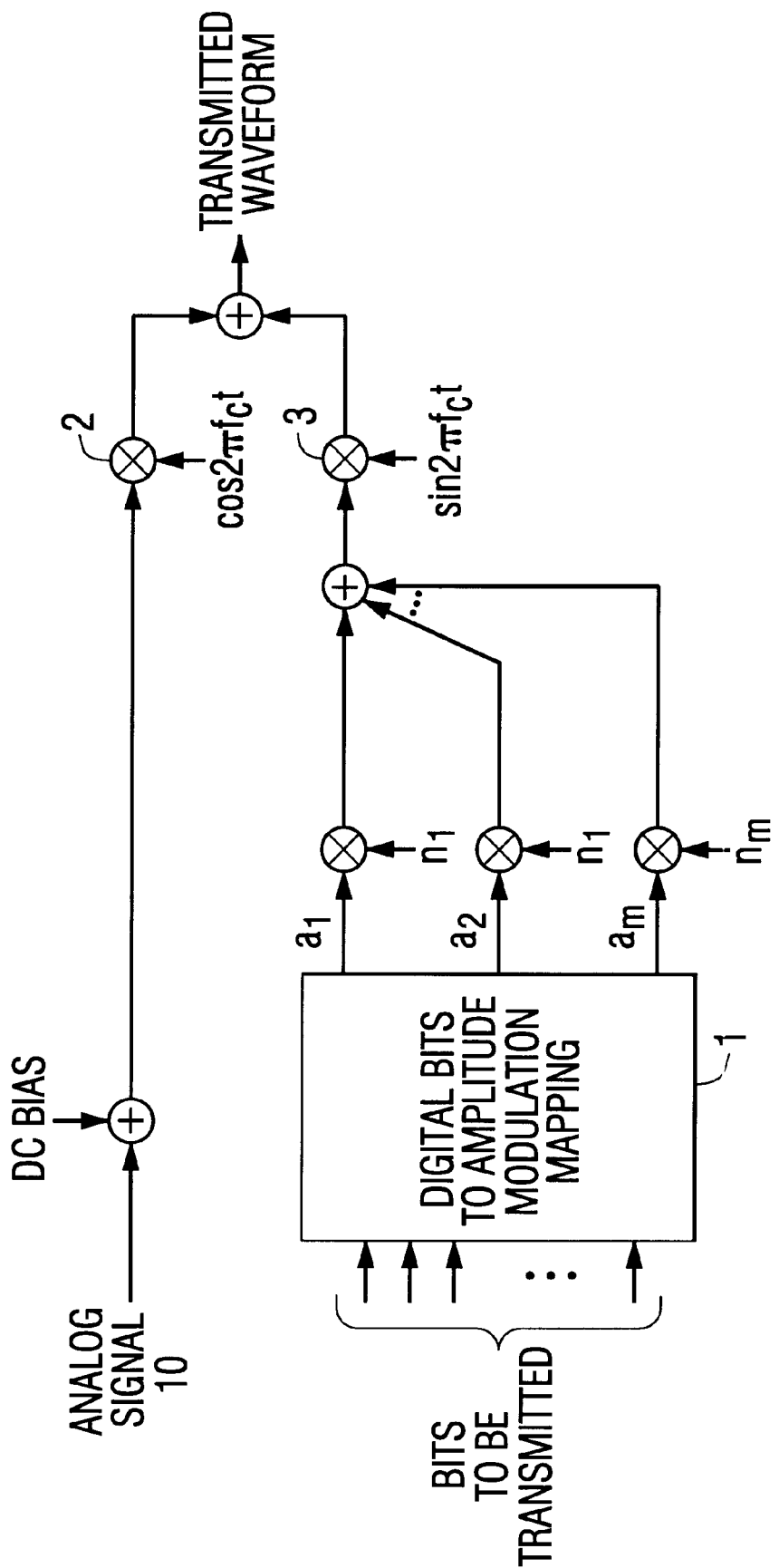
FIG. 8 illustrates a complementary modulator for lowpass sequences.

FIG. 8 illustrates a complementary modulator for producing noise-like sequences that are in quadrature to the analog AM signal. The bits to be transmitted are mapped to amplitude modulation coefficients by unit 1. Orthogonal real-valued noise-like sequences are modulated and added together. The sum is modulated at sin mixer 3 using a carrier that is in phase quadrature to the carrier that modulates the analog signal at cos mixer 2.

Figure 9:
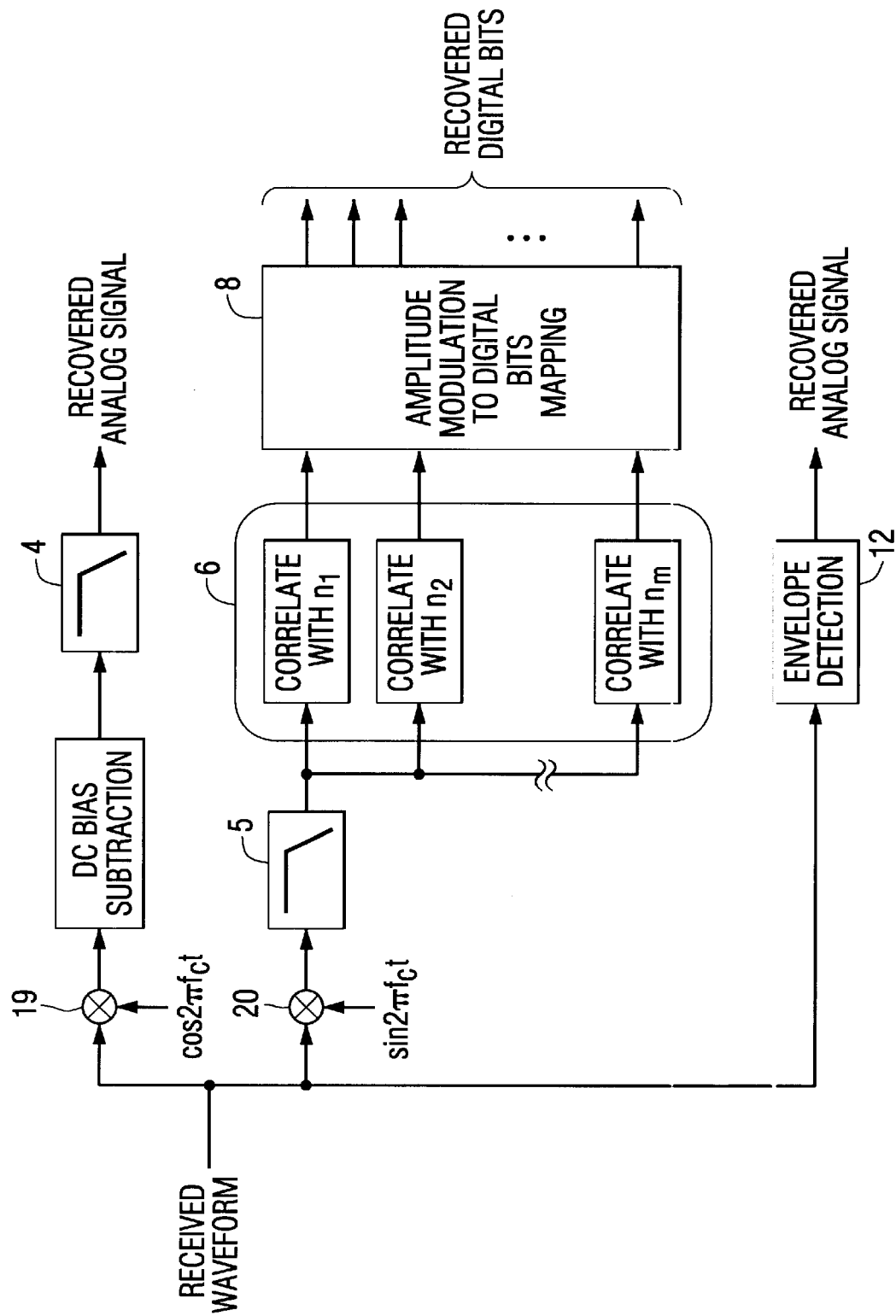
FIG. 9 is a block diagram for demodulator FIG. 8.

FIG. 9 is a block diagram of a demodulator for the modulator in FIG. 8. The in-phase and quadrature components are extracted from the received signal using cos mixer 19 and sin mixer 20. The analog signal can be recovered from the in-phase component at the output of the cos mixer 19 by subtracting the DC bias. Alternatively, if the quadrature component is small compared to the in-phase component, the analog signal can be recovered with minimal interference by using envelope detection unit 12 on the received signal. The quadrature component at the output of sin mixer 20 can be used to recover the digital data. The quadrature component is correlated at 6 with each of the noise-like sequences to recover the amplitude modulation data. A mapping of the amplitude modulation data at AM to digital mapping unit 8 is then used to recover the digital information.

Figure 10:
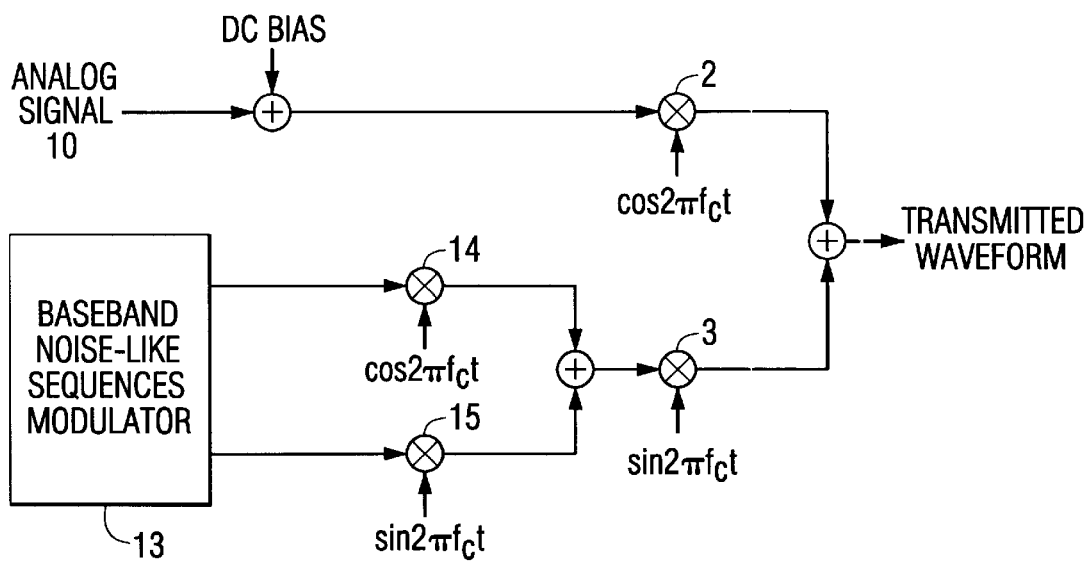
FIG. 10 illustrates an alternative complementary modulator for FIG. 8.

FIG. 10 illustrates an alternative complementary modulator to the complementary modulator in FIG. 8. The baseband carriers are generated by baseband noise-like sequence generator 13 using a method of noise-like sequence generation described below. For example, in FIGS. 2 and 4 the baseband signals are the modulated noise-like sequences that are input to the cos mixer 2 and sin mixer 3. The baseband waveforms are then modulated in quadrature at cos mixer 14 and sin mixer 15 using a frequency of $f_0$ as shown in FIG. 10. To prevent aliasing, $f_0$ is chosen to be larger than the one-sided bandwidth of the noise-like waveforms. The outputs of mixers 14 and 15 are added and then modulated at sin mixer 3 using a carrier that is in phase quadrature to the carrier that modulates, at cos mixer 2, the analog portion of the signal.

Figure 11:
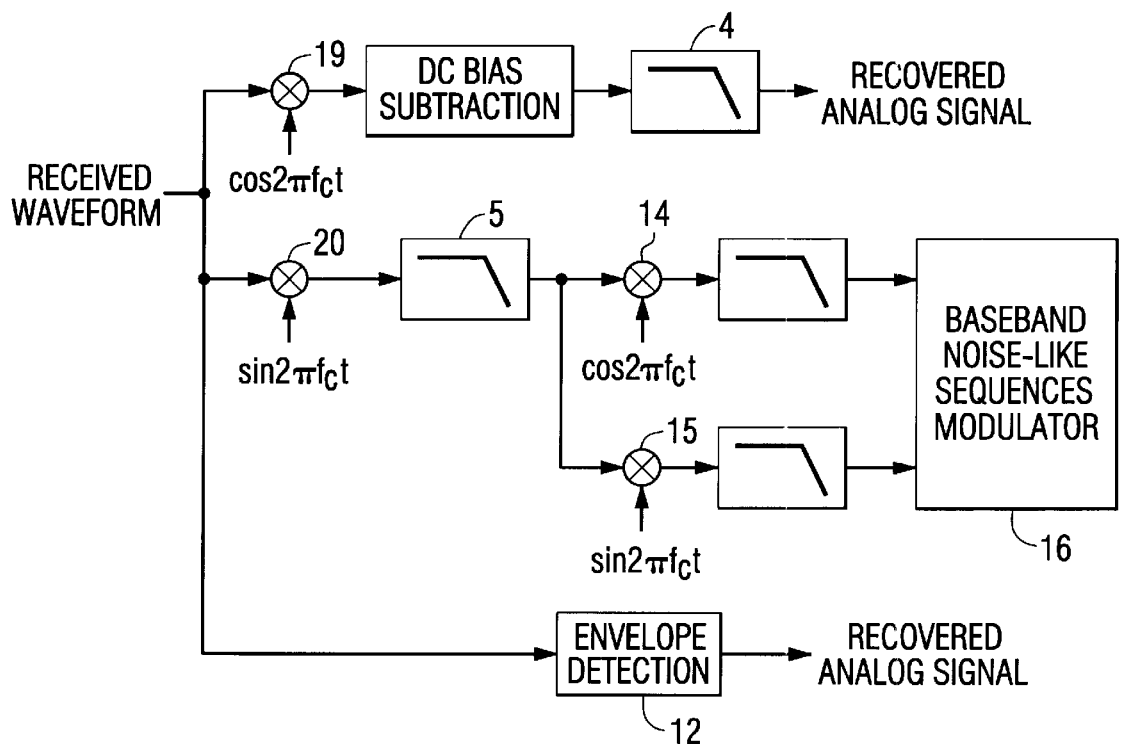
FIG. 11 is a block diagram of a demodulator for FIG. 10.

FIG. 11 is a block diagram of a demodulator for the modulator in FIG. 10. The in-phase and quadrature components are extracted from the received signal using cos mixer 19 and sin mixer 20. The analog signal can be recovered from the in-phase component or by using envelope detection unit 12 on the received signal. The quadrature component is input to $\cos(2\pi f_0 t)$ mixer 14 and $\sin(2\pi f_0 t)$ mixer 15. The mixer outputs are then input to a baseband noise-like sequences demodulator 16. For example, based on the modulator that is used, an appropriate demodulator like those shown in FIGS. 3 and 5 could be used. The baseband section of these demodulators corresponds to the components following the initial mixers.

The waveforms which are being multidimensionally modulated are spreading waveforms since their bandwidth is much greater than the symbol rate. Traditional direct sequence spread spectrum (DS-SS) systems typically utilize maximal-length (ML) pseudo-random binary sequences (PRBS) as the spreading waveforms. This invention utilizes non-binary orthogonal spreading sequences. Alternatives for generating these sequences are described below. In each case, waveforms are generated which have a composite wide bandwidth relative to the symbol rate. These waveforms are shaped and orthogonalized to produce spectrally contained, wideband, continuous valued, orthogonal spreading waveforms. The orthogonalization procedures are also described below.

A random number generator may be used to generate the initial pseudo-random sequences. These sequences may then be shaped (filtered) by convolution with a shaping waveform. The sequences may then be made mutually orthogonal to each other by use of the appropriate basis generating algorithm discussed below.

The statistics of the particular random number generator used may be chosen to match the noise of the environment to reduce the probability of detection by unintended receivers. In a gaussian noise environment a gaussian random number generator may be employed. Gaussian signals are unique in that they do not exhibit higher-order moments or cumulants. This will result in waveforms that have more noise-like characteristics in a gaussian noise environment. If the noise statistics of the environment are not gaussian but are known, a random number generator may be employed that has similar statistics to the environmental noise.

Conversely, it may be desirable to employ a random number generator whose statistics include non-zero, higher-order moments. This can enhance detectability since the waveforms would have statistics that differ from the environmental noise. This is acceptable if the traditional unintended co-channel or adjacent channel receiver is not sensitive to the statistics of the interference but only to the level, as is the case with an analog AM envelope detector.

A second method of generating the noise-like sequences is to use filtered maximal-length sequences. Since these sequences have better autocorrelation and cross-correlation properties, they will experience less cross-talk in some impaired channels.

One well-known method of generating sequences with excellent autocorrelation properties is the use of maximal-length PN sequences. These sequences have a length of $2^m-1$ where m is an integer. The autocorrelation has a peak value of $2^m-1$ for an offset of zero; it linearly decreases to $-1$ for an offset of $\pm 1$ bit, and has a value of $-1$ for all other offsets. These sequences could be generated, filtered to have the desired spectral characteristics, and orthogonalized to produce the noise-like sequences.

Although the maximal-length sequences have excellent autocorrelation properties, the cross-correlation properties are not optimal and may be poor. Gold and Kasami sequences provide better cross-correlation properties at the expense of degraded autocorrelation properties. However, both the autocorrelation and cross-correlation values are bounded. In the case of the Kasami sequences, both the autocorrelation and cross-correlation functions are bounded to a value of $2^{m/2}+1$, which is the theoretical lower bound. Similar to the maximal-length sequences, the Gold and Kasami sequences could be generated, filtered to have the desired spectral shape, and orthogonalized to produce the noise-like waveforms.

Alternatively, PRBS sequences may be transmitted and received through a matched pair of spectrally factored zero-ISI pulse-shaping filters. Sampling the output of the receive filter at the optimum sampling instant recovers the input PRBS sequence.

As another alternative, since the sequences are orthogonal to begin with, they may be filtered at the transmitter and inverse filtered at the receiver. In this case the transmitted waveforms are not mutually orthogonal. Orthogonality is restored by the inverse filtering at the receiver.

A set of orthogonal sinusoids may also be used to generate pseudo-random waveforms. Though each sinusoidal waveform is narrowband, a set of orthogonal sinusoids that cover a composite wide bandwidth may be used. The amplitude of these sinusoids may be varied across frequency to conform to an arbitrary spectral mask. The sinusoids are first shaped ("windowed"). When singular value decomposition (SVD) is used to orthogonalize the set of waveforms, each of the resulting basis vectors contain components from each of the original waveforms and thus are wideband. Note that the other methods of generating an orthonormal basis (Gram-Schmidt orthogonalization, Modified Gram-Schmidt orthogonalization, and QR decomposition) will not produce wideband waveforms from a set of narrowband waveforms.

The shaped pseudo-random waveforms may be made mutually orthogonal to each other (orthogonalized) by the use of one of the following algorithms. These algorithms are often employed to create an orthonormal set of N output vectors that span the same space as some set of N input vectors. This set of output vectors is called an orthonormal basis. Each of the original N vectors may then be reconstructed from a linear sum of the scaled basis vectors.

SVD produces an orthonormal basis set using a constrained least-squares criterion. In general, SVD preserves the spectral energy of the sum of the input waveforms; however, any unique spectral properties of specific input waveforms are not preserved. Therefore, SVD is not an appropriate orthogonalization procedure if it is desirable for the orthogonal waveforms to be spectrally distinct.

The Gram-Schmidt orthogonalization (GSO) algorithm also produces an orthonormal basis set. The resulting basis differs from that produced by SVD in that if the input waveforms have distinct spectral properties from each other, these properties are preserved in theresulting basis set. Due to numerical considerations, the modified Gram-Schmidt (MGS) algorithm can be used in practice.

The QR decomposition (QRD) is another method of generating an orthonormal basis set. The basis set produced by QRD is similar to that generated by GSO/MGS in that the distinct spectral properties of the input waveforms are preserved in the resulting basis set.

For good acquisition performance, a reference waveform (or unmodulated orthogonal sequence) could be transmitted. This waveform should have the best autocorrelation, cross-correlation, and time-frequency distribution properties available. Thus, if the SVD algorithm is used to generate the sequences, this waveform should be the waveform with the highest singular value. Similar considerations apply when using the GSO or MGS algorithms. The power transmitted in this waveform may also be increased or decreased relative to the others to provide a higher signal-to-noise ratio and improved acquisition time.

Since the analog AM signal is transmitted together and synchronously with the DAB signal, the AM carrier may be used to facilitate frequency and phase synchronization. Thus, carrier frequency and phase synchronization is accomplished using standard frequency and phase-locked loops.

The equalizer update function can operate in two major modes: acquisition and tracking. During acquisition mode, the system can sequentially block average the input signal to estimate the channel response to the reference waveform, the other waveforms' modulation causing them to average to zero. The initial averaging will take place at an arbitrary phase on the timing waveform, and a circular convolution performed using the received waveform and reference waveforms with the equalizer fixed at an a prior channel estimation. Tuning lock is declared based on a correlation threshold, and the timing phase is adjusted to nominal zero. The equalizer update function is then enabled, with its input being the output of the averager.

At this point in the control sequence, the data-recovery correlators will be enabled. Metrics on the data channels, including the estimated error rate via the FEC decoder, will be used to decide when the eye diagrams are open, at which time equalizer lock will be declared.

In certain embodiments after equalizer lock is declared, equalizer tracking continues using the averager as during equalizer acquisition. At the expense of a more complicated receiver, additional performance can be obtained in the tracking mode by using decision-aided feedback. One common form of decision-aided feedback is known as demod-remod. In this embodiment, the output of the demodulator is fed to a modulator that is used to generate an estimate of the transmitted signal. This estimated transmitted signal, together with the non-averaged received signal, is used by the error function to drive the equalizer update algorithm. The main advantage to the demod-remod is that the entire transmitted signal power can be used to drive the error function. In certain situations of rapid channel variation, the added advantage of avoiding the delay in the averager is also important. The price of this added performance is the additional circuitry required for the modulator function.

Symbol timing synchronization is performed after carrier synchronization. Timing synchronization has two modes: acquisition and tracking. The timing acquisition process was described above. This process guarantees acquisition because its pull-in range is ± half a sample.

Once initial symbol timing is acquired, symbol tracking is enabled. One method of tracking symbol timing uses an early/late-gate structure. This involves computing correlations up to one half sample early and up to one half sample late in order to get an error signal. This is computationally burdensome and may be undesirable in implementation. Alternatively, the symbol timing may be tracked using the equalizer. In this case, the magnitude of the equalizer coefficients are viewed as a function of time. The error signal is derived from the first moment of this function and its proximity to the center of the equalizer.

The AM transmission band suffers from increased interference at night due to skywave propagation. Therefore, an in-band, on-channel AM compatible DAB system may not be able to support as high of a channel capacity at night as during the day. One method of dealing with this problem is to transmit a different waveform at night when interference increases.

The night mode of transmission could use a lower audio encoding rate, reduced modulation complexity for the noise-like sequences, more error correction coding, reduced bandwidth, or a combination of these. The audio encoder would have an input control that determines if day or night mode should be used for encoding and modulation. The state of this control would be dependent on the time of day and the time of year. The use of this feature by a station may not be mandatory. Receivers could switch to the appropriate mode by using stored or preset-time-of day and time-of-year information. Alternatively, part of the auxiliary data transmitted by a station could indicate if a station was transmitting in day or night mode. The receiver could sense this and perform the proper demodulation and decoding. In another embodiment, the receiver could exploit differences between the day and night waveform to automatically select the appropriate mode.

Figure 12:
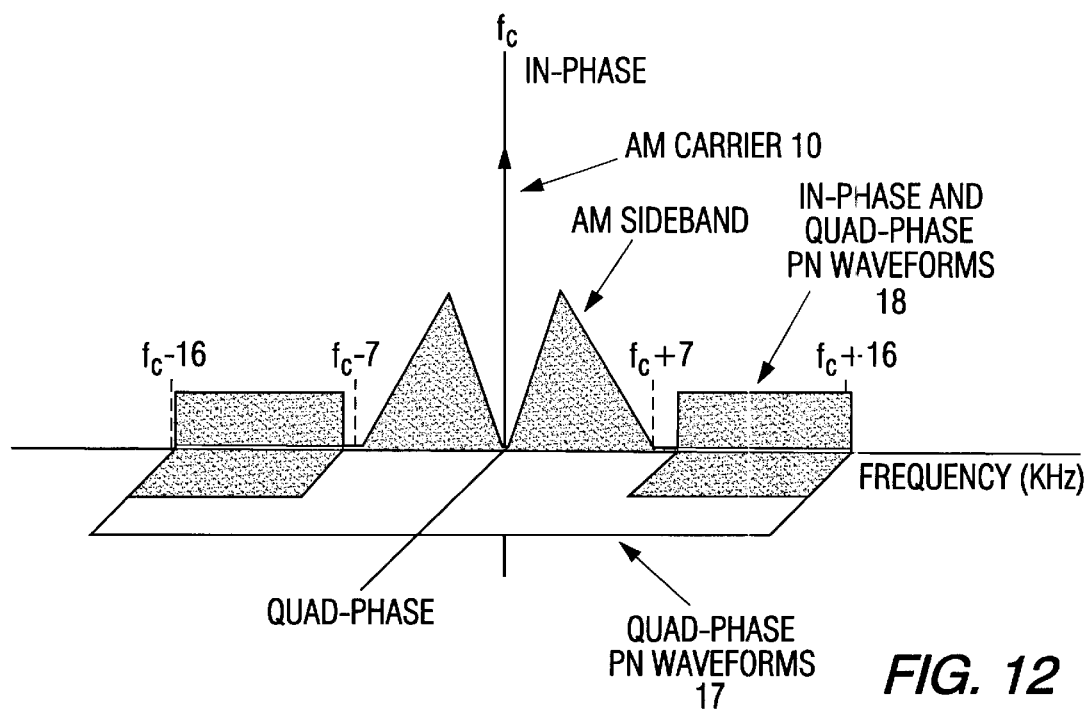
FIG. 12 is a spectral representation of a composite analog AM and digital broadcasting signal of a first method.

FIG. 12 is a spectral representation of an AM digital audio broadcasting signal having carriers positioned in accordance with a first embodiment of this invention. This method utilizes amplitude modulation on the lowpass waveforms 17 that spectrally overlap the analog AM signal 10. They are modulated in quadrature to the AM signal. The bandwidth of these waveforms is about 32 kHz. The other carriers are bandpass waveforms 18 that occupy the spectrum from approximately $f_c+7$ kHz to $f_c+16$ kHz and from approximately $f_c-7$ kHz to $f_c-16$ kHz, where $f_c$ is the AM carrier frequency. These bandpass waveforms may be QAM phase or amplitude modulated.

The bandpass and lowpass waveforms must be orthogonal to each other. In order to retain their distinct spectral characteristics MGS or QRD must be used to orthogonalize the shaped waveforms.

The steps to generate the basis waveforms are as follows:

Form an N×M matrix whose columns are generated as described above in connection with the description of random noise generation. N is the length of the sequences, and M is the number of sequences.

Shape K of the sequences by convolution with a length-L lowpass FIR filter.

Shape the remaining M-K sequences by convolution with a length-L bandpass FIR filter.

Input the resulting (N+L−1)×M matrix of shaped sequences to MGS or QRD.

The first K columns of the resulting matrix are the lowpass sequences, and the remaining columns are the bandpass sequences.

Figure 13:
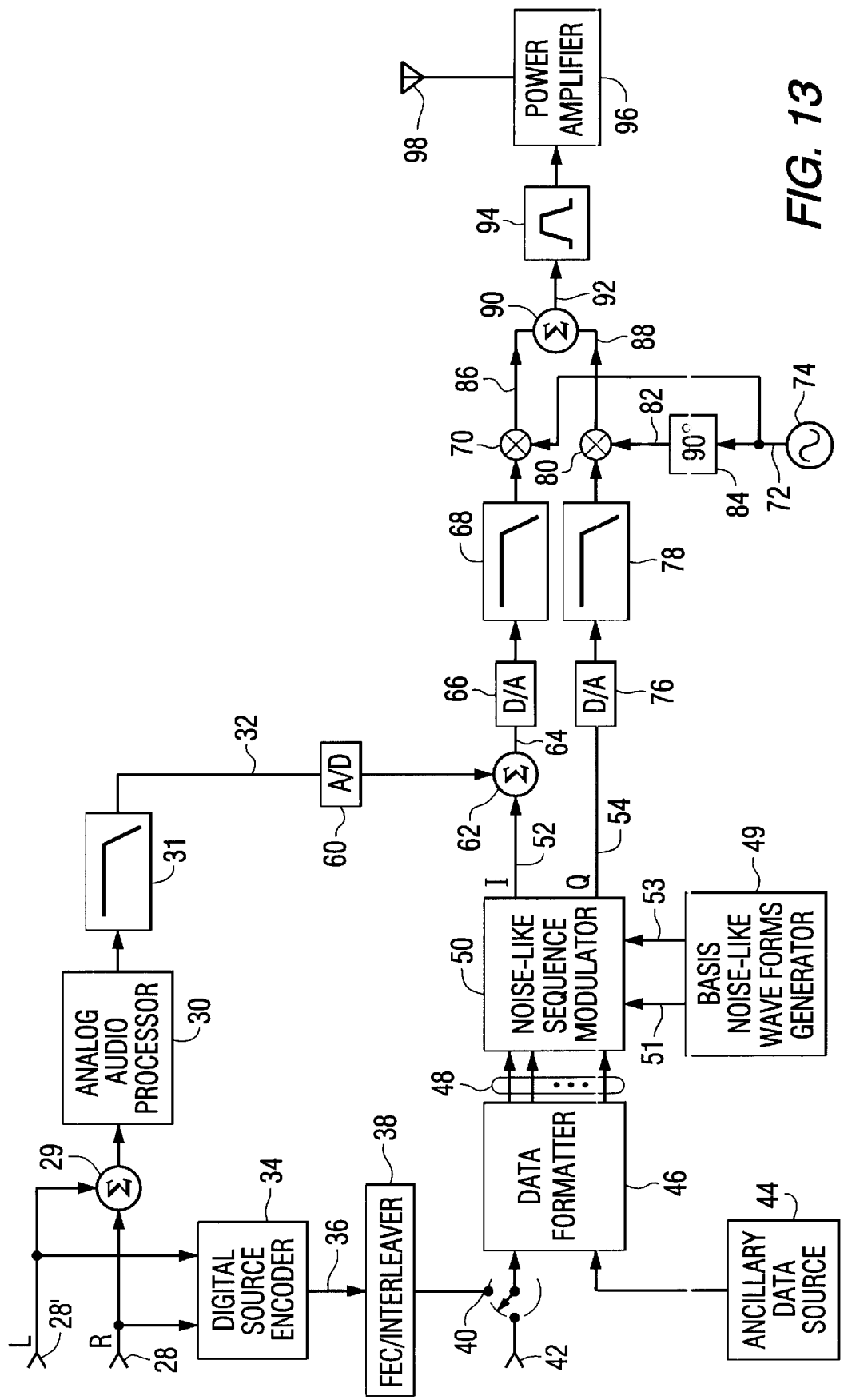
FIG. 13 is a block diagram of a transmitter in accordance with the present invention.

FIG. 13 is a block diagram of a transmitter constructed in accordance with this method. An analog program signal (which in this example includes right 28 and left 28' stereo portions) that is to be transmitted is impressed onto input terminals 28 and 28'. The left and right channels are combined in summation point 29 and then fed through an analog audio processor 30 to increase the average analog AM modulation from which extends the coverage region considerably. Such processors are commonplace at analog AM radio stations throughout the world. The processed analog signal is passed through a low pass filter 31 having a sharp cutoff characteristic, to produce a filtered monaural analog program signal on line 32. Filter 31 may, for example, have a cutoff frequency of 6 kHz and 40 dB attenuation beyond 6.5 kHz.

For those applications in which the analog and digital portions of transmitted signal will be used to convey the same program material, a digital source encoder 34 converts the right and left analog program signals to an encoded digital signal on line 36. A forward error correction encoder and interleaver circuit 38 improves data integrity over channels corrupted with impulsive noise and interference, producing a digital signal on line 40. For those instances where the digital signal to be transmitted is not a digital version of the analog program signal a data port 42 is provided to receive the digital signal. An ancillary data source 44 is also provided for those instances in which the digital version of the analog program signal, or a digital signal supplied to port 42, is to be supplemented by including additional data. A switch 41 may be provided for selecting between the signals on lines 40 and 42.

Figure 14:
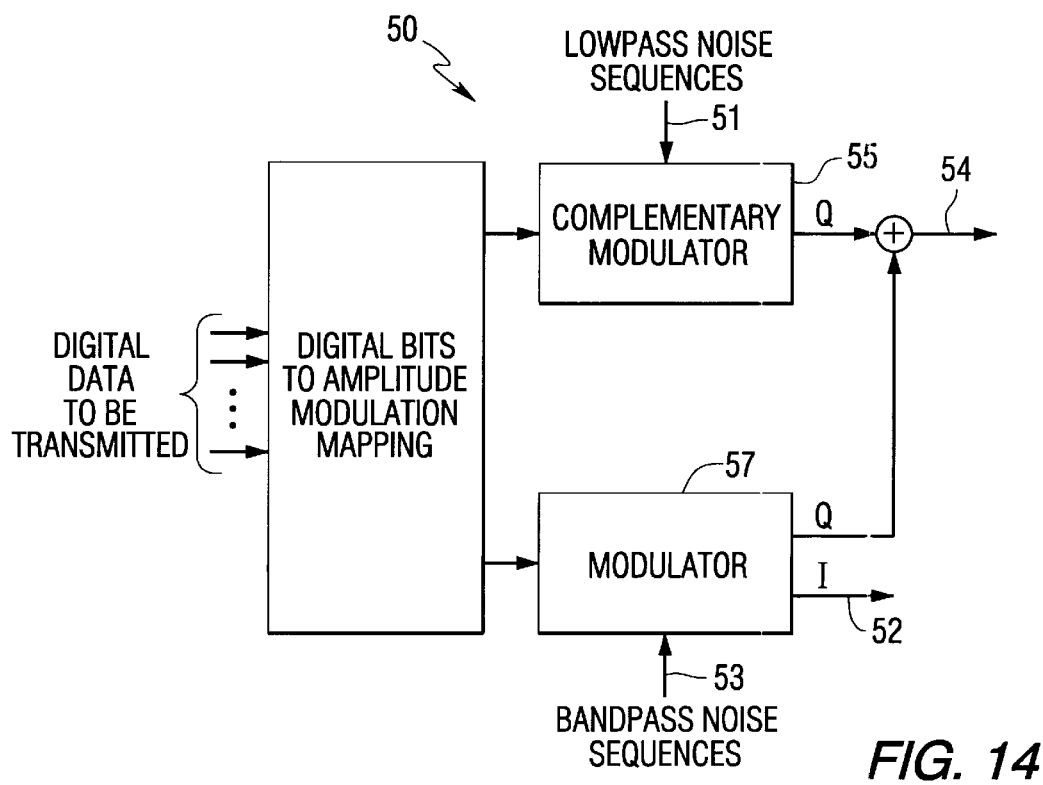
FIG. 14 is a block diagram of the modulator used in the transmitter of FIG. 13.

Data formatter 46 receives the digital data and produces a plurality of outputs on lines 48. The data formatter combines the desired inputs in a form suitable for use as input to a modulator. For example, if the input consists only of the output from the FEC and interleaver, the data formatter may be a serial-to-parallel converter. The data formatter output is input to an orthogonal noise-like sequence modulator 50. A basis waveform generator 49 provides a plurality of shaped, orthogonalized basis waveforms to modulator 50. A block diagram of modulator 50 is shown in FIG. 14. A typical architecture for modulator 50 comprises two component modulators, bandpass sequence modulator 57, and complementary modulator 55. Lowpass sequences on line 51 are modulated in complementary modulator 55, which may be similar to the modulator in FIG. 8. Bandpass noise sequences on line 53 are modulated in modulator 57, which may utilize a method similar to those illustrated in FIGS. 2 and 4. In modulator 50, the data to be transmitted is mapped to amplitude modulation coefficients. Line 52 represents the in-phase output of modulator 57 and line 54 represents the combined quadrature outputs of both complementary modulator 55 and modulator 57. As depicted in FIG. 13, the processed baseband analog AM signal is converted to a digital signal by analog-to-digital converter 60 and combined with the in-phase portion of the digital DAB waveform at summation point 62 to produce a composite signal on line 64. The composite signal on line 64 is converted to an analog signal by analog-to-digital converter 66, filtered by low pass filter 68, and passed to a mixer 70 where it is combined with a radio frequency signal produced on line 72 by a local oscillator 74. The quadrature signal on line 54 is converted to an analog signal by analog-to-digital converter 76 and filtered by low pass filter 78 to produce a filtered signal which is combined in a second mixer 80, with a signal on line 82. The signal on line 72 is phase shifted as illustrated in block 84 to produce the signal on line 82. The outputs of mixers 70 and 80 are delivered on lines 86 and 88 to a summation point 90 to produce a composite waveform on line 92. The spurious mixing products are muted by bandpass filter 94, and the resulting DAB signal is subsequently amplified by a power amplifier 96 for delivery to a transmitting antenna 98

Figure 15:
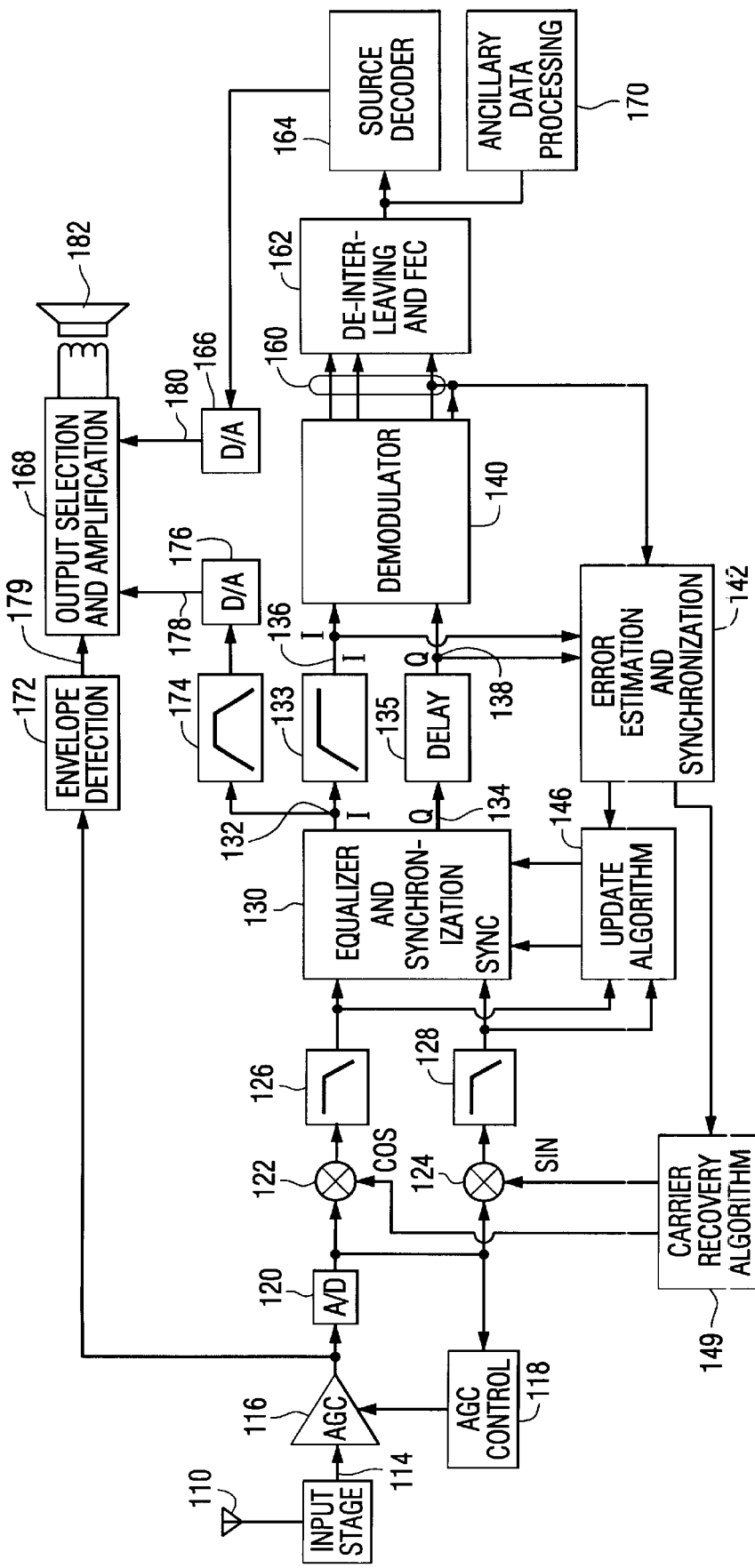
FIG. 15 is a block diagram of a receiver in accordance with the present invention.
Figure 16:
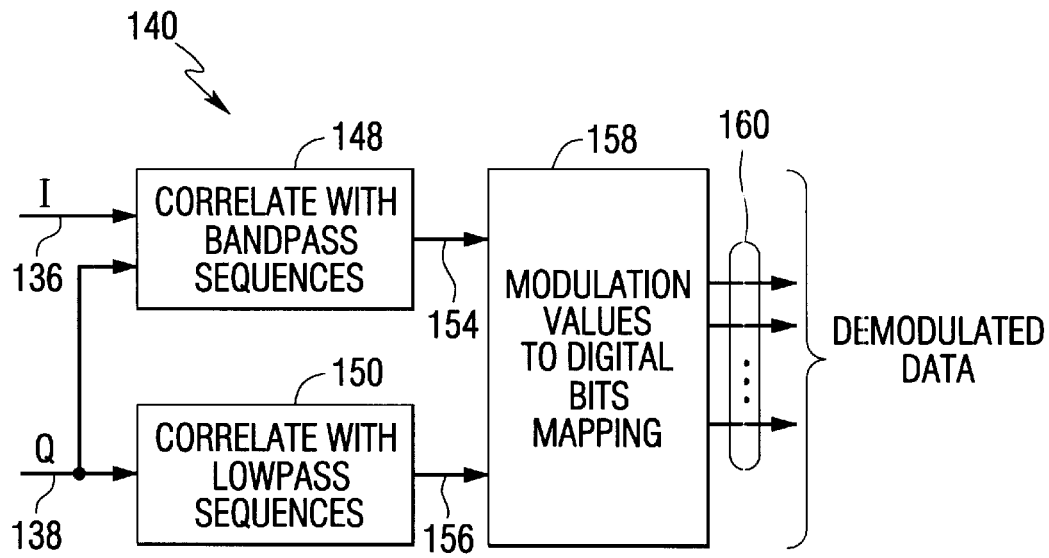
FIG. 16 is a block diagram of the demodulator used in the receiver of FIG. 15.

FIG. 15 is a block diagram of a receiver constructed to receive digital and analog signals broadcast in accordance with this invention. A receiving antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through automatic gain circuit 116 and automatic gain control 118 to A/D converter 120. From A/D converter 120 the digitized signal is input to cos and sin mixers, 122 and 124, that may shift the signal in frequency and form quadrature components. The mixer outputs are filtered at lowpass filters 126 and 128 to eliminate the sum frequency terms. The filter outputs are input to an equalizer and synchronization circuit 130. This circuit synchronizes the processing to the frame time and compensates for distortions in the received waveform that may result from channel anomalies. The in-phase output 132 of the equalizer is highpass filtered at 133 to eliminate the analog AM signal. The quadrature phase output 134 of the equalizer is delayed at 135 to match the delay of the highpass filtered in-phase signal 136. The filtered, delayed I/Q pair 136 and 138 are fed to the demodulator 140 and an error estimation and synchronization circuit 142. A block diagram of demodulator 140 is shown in FIG. 16. The in-phase and quadrature signals 136 and 138 are both correlated with bandpass sequences at bandpass correlator 148. Additionally, the quadrature signal 138 is correlated with lowpass sequences at lowpass correlator 150. The correlator outputs, 154 and 156, which are the recovered modulation values, are mapped to demodulated bits at AM to digital mapping unit 158. As depicted in FIG. 15, signals 160 from demodulator 140 are output into a de-interleaving and FEC (error correction circuit) unit 162 and also back into the error estimation and synchronization circuit 142. The output from de-interleaving and FEC unit 162 is processed by a source decoder 164, converted to an analog signal by D/A converter 166, and fed to an output stage 168. Additionally, the de-interleaver and FEC 162 circuit may be processed by an ancillary data circuit 170. Error estimation and synchronization circuit 142, which may include a remodulation of the demodulated data, computes error signals for the synchronization and equalizer update algorithms. Output from the error estimation and synchronization circuit 142 is fed into the update algorithm unit 146 which supplies timing synchronization and weight adaptation information to the equalizer and synchronization unit 130. The transmitted analog signal can be recovered by either envelope detection at 172 or by processing the recovered in-phase signal 132 with low pass filter 174 and then converting to an analog signal at D/A converter 176. Output stage 168 can select between one or a combination of the recovered signals 178, 179, and 180, and output the signal to a device such as an audio speaker 182.

As an alternative to the method described above, the complementary modulator in FIG. 14 may be implemented using the baseband processing shown in FIG. 10, including the $\cos(2 \pi f_0 t)$ and $\sin(2 \pi f_0 t)$ mixers 14 and 15. In this case the lowpass signal correlator 150 shown in FIG. 16 could be implemented with the baseband portion of the circuit in FIG. 11, including the $\cos(2 \pi f_0 t)$ and $\sin(2 \pi f_0 t)$ mixers 14 and 15.

Figure 17:
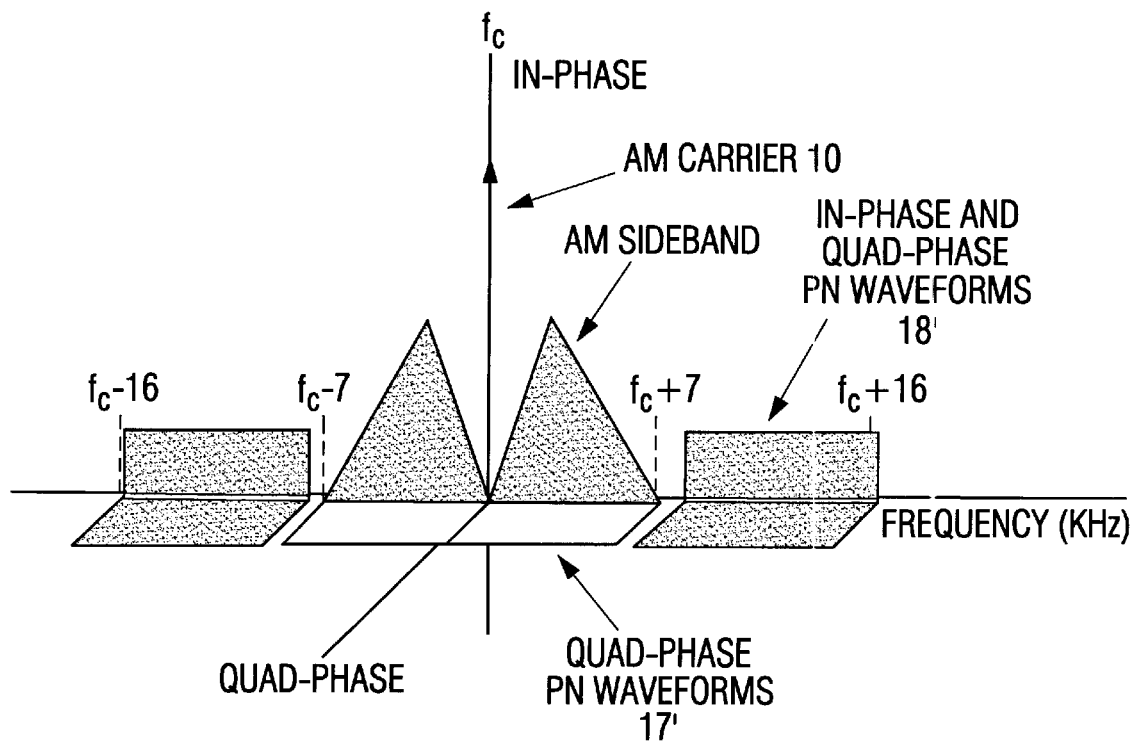
FIG. 17 is a spectral representation of a composite analog AM and digital broadcasting signal of a second method.

FIG. 17 is a spectral representation of an AM digital audio broadcasting signal having carriers positioned in accordance with a second embodiment of this invention. This method utilizes double sideband QAM modulated lowpass waveforms 17' for the carriers that spectrally overlap the analog AM signal. They are modulated in quadrature to the AM signal. The bandwidth of these waveforms is approximately 14 kHz. The other carriers are bandpass waveforms 18' that occupy the spectrum from approximately $f_c+7$ kHz to $f_c+16$ kHz and from approximately $f_c-7$ kHz to $f_c-16$ kHz, where fc is the AM carrier frequency. These bandpass waveforms are QAM modulated.

The bandpass waveforms must be mutually orthogonal to each other, as do the lowpass waveforms. In general, SVD, MGS or QRD may be used to orthogonalize the waveforms. The steps to generate the basis waveforms are as follows:

Form an N×M matrix whose columns are generated as described above in connection with the description of random noise generation. N is the length of the sequences, and M is the number of sequences.

Shape the sequences by convolution with a length-L lowpass FIR filter.

Input the resulting (N+L-1)×M matrix of shaped sequences to SVD, MGS or QRD.

The first M columns of the resulting matrix are the length N+L-1 orthogonal lowpass waveforms to be modulated.

Form an N×P matrix whose columns are generated as described above in connection with the description of random noise generation. N is the length of the sequences, and P is the number of sequences.

Shape the sequences by convolution with a length-L bandpass FIR filter.

Input the resulting (N+L-1)×P matrix of shaped sequences to SVD, MGS or QRD.

The first P columns of the resulting matrix are the length N+L-1 orthogonal bandpass waveforms to be modulated.

A transmitter like the one in FIG. 13 may be used to generate the waveforms for this method. Similarly, a receiver like that shown in FIG. 15 may be used, with the exception that the demodulator in FIG. 15 could have an architecture like that shown in FIG. 18.

Figure 18:
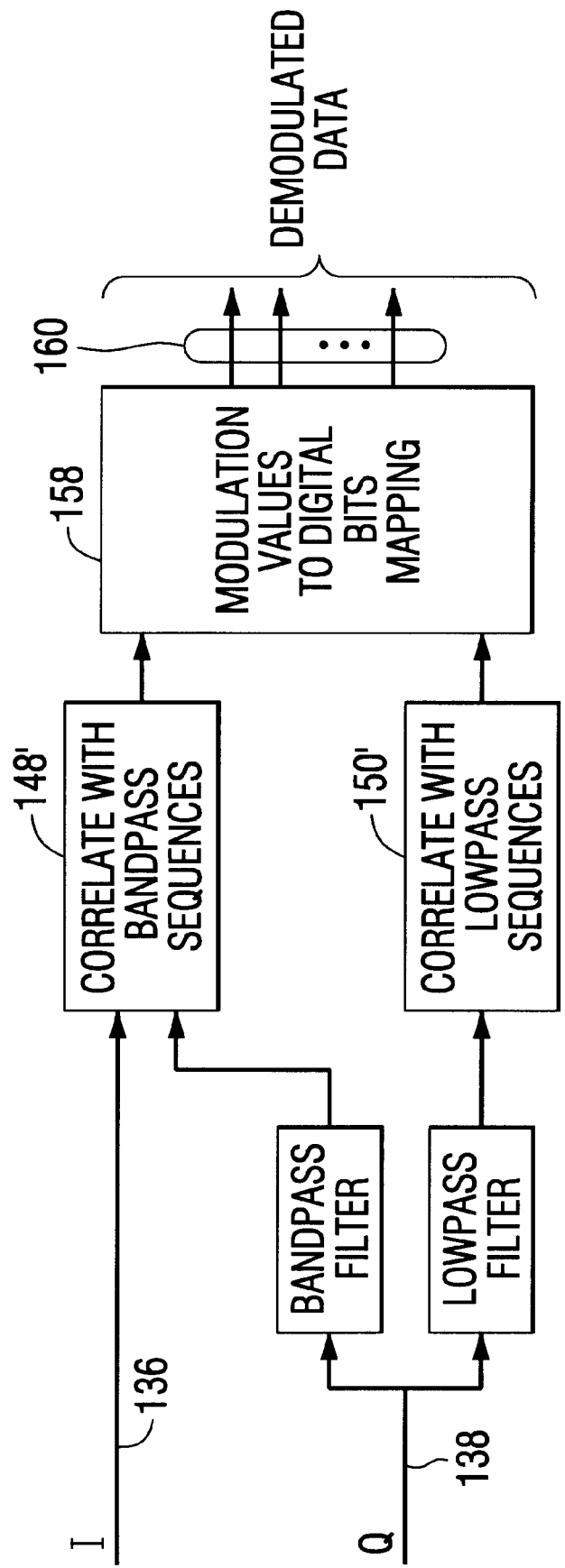
FIG. 18 is a block diagram of an alternate demodulator for the demodulator in FIG. 16.

FIG. 18 is a block diagram of an alternate demodulator. This alternate demodulator is like the demodulator in FIG. 16 except that bandpass and lowpass filters are added to filter the quadrature signal. These filters would not be needed if all of the noise sequences used are made orthogonal to each other.

As with the first embodiment, the complementary modulator in FIG. 14 may be implemented using the baseband processing shown in FIG. 10, including the $\cos(2 \pi f_0 t)$ and $\sin(2 \pi f_0 t)$ mixers. In this case the lowpass signal correlator shown in FIG. 18 could be implemented with the baseband portion of the circuit in FIG. 11, including the $\cos(2 \pi f_0 t)$ and $\sin(2 \pi f_0 t)$ mixers.

Although the present invention has been described in terms of an AM compatible digital audio broadcasting system, it should be understood that the technique could be applied to any system that transmits digital signals along with analog amplitude modulated signals. Furthermore, it should be understood that the information sent by the digital signal can be different from the information sent by the analog amplitude modulated signal. Therefore the methods of this invention can be used to transmit data of various types, such as traffic or weather information, video signals or military communication signals, in combination with an amplitude modulated signal. Potential application areas include amplitude modulated military communications, and television signals in which the video information is amplitude modulated.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims and any and all embodiments thereof.

What is claimed is:

1. A method for multidimensional modulation of noise-like waveforms, said method comprising the steps of:

a) generating a plurality of basis waveforms, said basis waveforms comprising real valued, shaped, orthogonalized noise-like spreading sequences;

b) formatting data to be transmitted;

c) mapping first and second sets of amplitude modulation coefficients from said formatted data;

d) modulating a first set of said plurality of waveforms by said first set of amplitude modulation coefficients;

e) modulating a second set of said plurality of waveforms by said second set of amplitude modulation coefficients;

f) adding said first coefficient modulated set of waveforms together to produce a first summed set;

g) adding said second coefficient modulated set of waveforms together to produce a second summed set;

h) modulating said first summed set of waveforms in-quadrature with the desired carrier signal;

i) modulating said second summed set of waveforms in-phase with the desired carrier signal; and j) combining said in-quadrature modulated waveforms with said in-phase modulated waveforms to produce a resultant digitally modulated signal.

2. The method according to claim 1 wherein a single set of said amplitude modulation coefficients modulates a single set of said basis waveforms, wherein said single set of coefficient modulated waveforms is added together to form a single summed set, and wherein said single summed set is modulated in-quadrature with said desired carrier to produce a resultant digitally modulated signal.

3. The method of claim 1, wherein said first coefficient modulated set of waveforms is at least one of identical to, orthogonal to, related through a time rotation or amplitude scaling factor to, or independent of said second coefficient modulated set of waveforms.

4. The method of claim 1, wherein said plurality of basis waveforms generated comprises complex valued noise-like spreading sequences having real and imaginary components, and wherein a single set of said complex noise-like sequences is modulated by said first and second coefficients, further comprising the steps of:
 a) amplitude modulating said real components by said first set of amplitude modulation coefficients to produce a first coefficient modulated set of real components;
 b) amplitude modulating said real components by said second set of amplitude modulation coefficients to produce a second coefficient modulated set of real components;
 c) amplitude modulating said imaginary components by said first set of amplitude modulation coefficients to produce a first coefficient modulated set of imaginary components;
 d) amplitude modulating said imaginary components by said second set of amplitude modulation coefficients to produce a second coefficient modulated set of imaginary components;
 e) adding said first coefficient modulated set of real components to said second coefficient modulated set of imaginary components to produce a first set of pairs;
 f) adding said first coefficient modulated set of imaginary components to said second coefficient modulated set of real components to produce a second set of pairs;
 g) adding said first set of pairs together to produce the first summed set; and
 h) adding said second set of pairs together to produce the second summed set, such that said modulating said first and second summed sets in-phase and in-quadrature with said desired carrier and said combining of said modulated first and second summed sets are performed to produce said resultant digitally modulated signal.

5. The method of claim 4, wherein said complex noise-like sequences are generated such that said real and imaginary components are orthogonal to each other.

6. The method according to claim 1 wherein said basis waveforms are generated comprising the steps of:
 a) generating a plurality of noise-like spreading sequences;
 b) filtering said plurality of noise-like sequences by convolution with a shaping waveform; and
 c) orthogonalizing said filtered sequences.

7. The method according to claim 6 wherein the noise-like spreading sequences are generated by a random number generator.

8. The method according to claim 7 wherein the statistics of said random numbers are chosen to match the statistics of the environment noise.

9. The method according to claim 7 wherein the statistics of said random numbers are chosen to include non-zero higher order moments.

10. The method according to claim 6 wherein the noise-like sequences are generated using maximal length sequences.

11. The method according to claim 6 wherein the noise-like sequences are generated using Gold and Kasami sequences.

12. The method according to claim 6 wherein the noise-like sequences are generated via sets of orthogonal sinusoids.

13. The method according to claim 6 wherein the shaped waveforms are orthogonalized utilizing singular value decomposition algorithms.

14. The method according to claim 6 wherein the shaped waveforms are orthogonalized utilizing at least one of Graham-Schmidt and Modified Graham-Schmidt algorithms.

15. The method according to claim 6 wherein the shaped waveforms are orthogonalized utilizing orthogonal triangular decomposition algorithms.

16. An apparatus for modulating noise-like waveforms into a multidimensional constellation comprising:
 a) means for generating a plurality of basis waveforms, said waveforms comprising multiple mutually orthogonal, continuous valued noise-like spreading sequences;
 b) means for formatting data to be transmitted;
 c) means for mapping amplitude modulation coefficients from said formatted data;
 d) means for modulating said basis waveforms with said amplitude modulation coefficients;
 e) means for adding said coefficient modulated waveforms to produce summed sets;
 f) means for modulating said summed sets in-phase or in-quadrature, or in-phase and in-quadrature, with the desired carrier signal; and
 g) means for combining said in-phase and/or in-quadrature modulated waveforms to produce a resultant digitally modulated signal.

17. A method of modulation in an AM channel wherein at least one set of basis waveforms is modulated by a first method of modulation and at least one set of basis waveforms is modulated by a second method of modulation, said first method of modulation comprising the steps of:
 a) generating a plurality of basis waveforms, said basis waveforms comprising shaped, orthogonalized noise-like spreading sequences;
 b) formatting data to be transmitted;
 c) mapping first and second sets of amplitude modulation coefficients from said formatted data;
 d) modulating a first set of said plurality of waveforms by said first set of amplitude modulation coefficients;
 e) modulating a second set of said plurality of waveforms by said second set of amplitude modulation coefficients;
 f) adding said first coefficient modulated set of waveforms together to produce a first summed set;
 g) adding said second coefficient modulated set of waveforms together to produce a second summed set;
 h) modulating said first summed set of waveforms in-quadrature with the desired carrier signal; and
 i) modulating said second summed set of waveforms in-phase with the desired carrier signal, wherein said in-phase modulated waveforms comprise a first resultant digitally modulated signal;
and wherein said second method of modulation comprises the steps of:
 a) generating the plurality of basis waveforms, said basis waveforms comprising shaped, orthogonalized noise-like spreading sequences;
 b) formatting the data to be transmitted;

c) mapping a third set of amplitude modulation coefficients from said formatted data;

d) modulating a third set of said plurality of waveforms by said third set of amplitude modulation coefficients;

e) adding said third coefficient modulated set of waveforms together to produce a third summed set;

f) modulating said third summed set of waveforms in-quadrature with the desired carrier to produce a second resultant digitally modulated signal; and h) combining said in-quadrature modulated waveforms of said first and second modulation methods to produce a third resultant digitally modulated signal.

18. The method according to claim 17 wherein said basis waveforms modulated by said first method are one of in-phase ASK and QAM modulated bandpass waveforms, wherein said basis waveforms modulated by said second method are ASK modulated lowpass waveforms, wherein said bandpass waveforms are modulated both in-phase and in-quadrature with the desired carrier signal, and wherein said lowpass waveforms are modulated in-quadrature with the desired carrier signal.

19. A method according to claim 18 wherein said lowpass waveforms have a bandwidth of approximately 32 kHz, wherein said bandpass waveforms occupy the spectrum from about $f_c$+7 kHz to $f_c$+16 kHz and from about $f_c$−7 kHz to $f_c$−16 kHz, and wherein $f_c$ is the AM carrier frequency.

20. The method according to claim 18 wherein the method for generating the basis waveforms comprises the steps of:

a) generating an N×M matrix of noise-like spreading sequences, where N is the length of the sequences and M is the number of sequences;

b) shaping the first K columns of the sequences by convolution with a length L lowpass FIR filter;

c) shaping the remaining M-K columns by convolution with a length L bandpass FIR filter, and d) orthogonalizing the resulting (N+L−1)×M matrix of shaped sequences using one of modified Graham-Schmidt and orthogonal triangular decomposition algorithms, wherein the first K columns of the resulting matrix are the lowpass sequences and the remaining columns are the bandpass sequences.

21. The method according to claim 17 wherein said basis waveforms modulated by said first method of modulation are QAM modulated bandpass waveforms, wherein said basis waveforms modulated by said second method are QAM modulated double sideband lowpass waveforms, wherein said bandpass waveforms are modulated both in-phase and in-quadrature with the desired carrier signal, and wherein said lowpass waveforms are modulated in-quadrature with the desired carrier signal.

22. A method according to claim 21 wherein said double sideband lowpass waveforms each have a bandwidth of about 14 kHz, wherein said bandpass waveforms occupy the spectrum from about $f_c$+7 kHz to $f_c$+16 kHz and from about $f_c$−7 kHz to $f_c$−16 kHz, and wherein $f_c$ is the AM carrier frequency.

23. The method according to claim 21 wherein the method for generating the basis waveforms comprises the steps of:

a) generating an N×M matrix of noise-like sequences, where N is the length of the sequences and M is the number of sequences;

b) shaping the sequences by convolution with a length L lowpass FIR filter;

c) orthogonalizing the resulting (N+M−1)×M matrix of shaped sequences utilizing one of singular value decomposition, modified Graham-Schmidt, and orthogonal triangular decomposition algorithms, wherein the first M columns of the resulting matrix are the length N+L−1 orthogonal lowpass waveforms to be modulated;

d) generating an N×P matrix of noise-like spreading sequences, where N is the length of the sequences and P is the number of sequences;

e) shaping the sequences by convolution with a length L bandpass FIR filter; and f) orthogonalizing the resulting (N+L−1)×P matrix of shaped sequences utilizing one of singular value decomposition, modified Graham-Schmidt, and orthogonal triangular decomposition algorithms, wherein the first P columns of the resulting matrix are N+L−1 orthogonal bandpass waveforms to be modulated.

\* \* \* \* \*